United States Patent [19]
Yoshinaga et al.

[11] Patent Number: 5,707,719
[45] Date of Patent: Jan. 13, 1998

[54] ORIENTED FILM INCLUDING POLYSTYRENE POLYMER HAVING SYNDIOTACTIC CONFIGURATION

[75] Inventors: Tomonori Yoshinaga; Naonobu Oda; Tadashi Okudaira, all of Ohtsu, Japan

[73] Assignee: Toyo Boseki Kabushiki Kaisha, Osaka, Japan

[21] Appl. No.: 654,583

[22] Filed: May 29, 1996

[30] Foreign Application Priority Data

May 29, 1995 [JP] Japan ................................. 7-130633
Jul. 5, 1995 [JP] Japan ................................. 7-169829

[51] Int. Cl.⁶ ............................. B32B 3/26; B32B 7/12
[52] U.S. Cl. ...................... 428/220; 428/338; 428/339; 428/910
[58] Field of Search ............................ 428/220, 338, 428/339, 910; 521/146

[56] References Cited

U.S. PATENT DOCUMENTS

| | | | |
|---|---|---|---|
| 4,824,629 | 4/1989 | Seitz et al. | 264/291 |
| 5,015,275 | 5/1991 | Beck et al. | 210/500.34 |
| 5,565,163 | 10/1996 | Forbes et al. | 264/290.2 |
| 5,610,455 | 3/1997 | Allen et al. | 428/212 |

FOREIGN PATENT DOCUMENTS

| | | |
|---|---|---|
| 1-110122 | 4/1989 | Japan . |
| 1-168709 | 7/1989 | Japan . |
| 1-182346 | 7/1989 | Japan . |
| 2-279731 | 11/1990 | Japan . |
| 3-74437 | 3/1991 | Japan . |
| 3-99828 | 4/1991 | Japan . |
| 3-109453 | 5/1991 | Japan . |
| 3-124427 | 5/1991 | Japan . |
| 3-131644 | 6/1991 | Japan . |
| 3-131843 | 6/1991 | Japan . |
| 6-91750 | 4/1994 | Japan . |

*Primary Examiner*—Morton Foelak
*Attorney, Agent, or Firm*—Fish & Neave

[57] ABSTRACT

An oriented polystyrene film including a polystyrene polymer having a syndiotactic configuration, the film having a thickness of 25 μm or more, and a rectangular sample of the film having a value C expressed by equation (I) of 0.007 or less:

$$C = \frac{A_{max}}{90°} \times \frac{HS_{max}}{R}, \quad (I)$$

wherein $A_{max}$ is obtained by designating four squares respectively in four apices of the rectangular sample, each square having sides of 100 mm in length, and setting an orientation direction of molecules of a first square to 0°, $A_{max}$ being an absolute value of a maximum angle among angles defined by the orientation direction of molecules of the first square and an orientation direction of molecules of each of the other three squares, R is expressed by equation (II) but is defined as 1 when exceeding 1:

$$R = D/1000 \quad (II),$$

and D is a distance (mm) between a center of gravity of the first square and a center of gravity of the square having the orientation direction which defines $A_{max}$ with the first square, and $HS_{max}$ is a size change ratio of a square sample which is cut from the rectangular sample and dry-heated at a temperature of 150° C. for 30 minutes, the square sample being designated in an apex of the rectangular sample and having sides of 100 mm in length.

6 Claims, 1 Drawing Sheet

ORIENTED FILM INCLUDING POLYSTYRENE POLYMER HAVING SYNDIOTACTIC CONFIGURATION

BACKGROUND OF THE INVENTION

1. Field of the Invention

The present invention relates to an oriented polystyrene film, and in particular to an oriented polystyrene film having a syndiotactic configuration which is maintained flat even after being coated and thus passes through a copier smoothly, and also has a high level of transparency.

2. Description of the Related Art

Oriented polystyrene films containing polystyrene polymers having a syndiotactic configuration, which have satisfactory thermal resistance, electric characteristics (such as dielectric constant, surface resistance, and dielectric dissipation factor), and transparency, have conventionally been developed. For example, Japanese Laid-Open Patent Publication Nos. 1-110122, 1-168709, 1-182346, 2-279731, 3-74437, 3-109453, 3-99828, 3-124427, and 3-131644 each disclose a biaxially stretched (oriented) polystyrene film usable in, for example, magnetic tapes, capacitors and films for packages. Furthermore, there has been a strong demand for such oriented polystyrene films containing polystyrene polymers having a syndiotactic configuration to be used as an alignment film in a liquid crystal display device, an OHP film, and a photographic film, utilizing a high thermal resistance and a high level of transparency thereof. However, the conventional oriented polystyrene films containing a polystyrene polymer having a syndiotactic configuration described in the above-mentioned publications exhibit problems with inferior adhesion to materials for polarization plates in liquid crystal display devices, gelatine emulsifiers, toner for copiers and the like.

Such a problem can be solved by covering the film with a material for improving such adhesion by coating or deposition as post-processing, but such a treatment deteriorates the flatness of the film. In the case where the resultant film is used as an OHP film, the lack of flatness in the film leads to the film not passing through the copier smoothly, resulting in wrinkles in the film, which may cause jamming of the copier.

Japanese Laid-Open Patent Publication No. 6-91750 discloses a method for improving the flatness of an oriented polystyrene film. However, the method described in this publication does not sufficiently improve the flatness of the film after the post-processing.

Other attempts to improve the flatness include using a more firm film and reducing the thermal shrinkage ratio. Such methods do improve the flatness of the film but also reduce the transparency of the film.

In order to produce a photographic film having a satisfactory level of transparency, Japanese Laid-Open Patent Publication No. 3-13183 discloses adjusting the absolute value Δn of the birefringence of the film to 40×10$^{-3}$ or less during the step of stretching and thermal fixation of the film. Such a method does not improve the transparency of the film to a satisfactory level.

SUMMARY OF THE INVENTION

The oriented polystyrene film including a polystyrene polymer having a syndiotactic configuration according to the present invention has a thickness of 25 μm or more, and a rectangular sample of the film has a value C expressed by equation (I) of 0.007 or less:

$$C = \frac{A_{max}}{90°} \times \frac{HS_{max}}{R} \quad (I)$$

The rectangular sample is obtainable from (A) or (B):

(A) a rolled film extending in a longitudinal direction (L) and having a width in a width direction (W) perpendicular to the longitudinal direction, two sides of the rectangular sample in the longitudinal direction (L) of the film each being 1,000 mm in length and the other two sides of the rectangular sample each having a size equal to the width of the film; or (B) a sheet of an any shape, the rectangular sample constituting an inscribed rectangle having an area larger than any other inscribed rectangle.

$A_{max}$ is obtained by designating four squares respectively in four apices of the rectangular sample, each square having sides of 100 mm in length, and setting an orientation direction of molecules of a first square to 0°, $A_{max}$ being an absolute value of a maximum angle among angles defined by the orientation direction of molecules of the first square and an orientation direction of molecules of each of the other three squares.

R is expressed by equation (II) but is defined as 1 when exceeding 1:

$$R = D/1000 \quad (II).$$

D is a distance (mm) between a center of gravity of the first square and a center of gravity of the square having the orientation direction which defines $A_{max}$ with the first square.

$HS_{max}$ is a size change ratio of a square sample which is cut from the rectangular sample and dry-heated at a temperature of 150° C. for 30 minutes, the square sample being designated in an apex of the rectangular sample and having sides of 100 mm in length.

In one embodiment of the invention, $A_{max}$ is 21° or less.

In another embodiment of the invention, an absolute value of $HS_{max}$ is 0.03 or less.

In another aspect of the present invention, an oriented polystyrene film including a polystyrene polymer having a syndiotactic configuration has a haze of 1% or less and a planar orientation degree ΔP expressed by equation (III) of −0.06 to −0.04:

$$\Delta P = \frac{N_X + N_Y}{2} - N_Z, \quad (III)$$

where $N_x$ is a refractive index of the film in a longitudinal direction, $N_y$ is a refractive index of the film in a width direction, and $N_z$ is a refractive index of the film in a thickness direction.

In one embodiment of the invention, the oriented polystyrene film has a thermal shrinkage ratio of 2% or less when heated at a temperature of 150° C. for 30 minutes.

In another embodiment of the invention, the oriented polystyrene film has a thickness of 25 μm or more.

Thus, the invention described herein makes possible the advantages of (1) providing an oriented polystyrene film having a syndiotactic configuration which is maintained sufficiently flat after being treated with post-processing such as coating, (2) providing an oriented polystyrene film having a syndiotactic configuration which can pass through a copier without being jammed or wrinkled, and (3) providing an oriented polystyrene film having a syndiotactic configuration which has a satisfactory level of transparency.

These and other advantages of the present invention will become apparent to those skilled in the art upon reading and understanding the following detailed description with reference to the accompanying figures.

DESCRIPTION OF THE PREFERRED EMBODIMENTS

Figure 1:
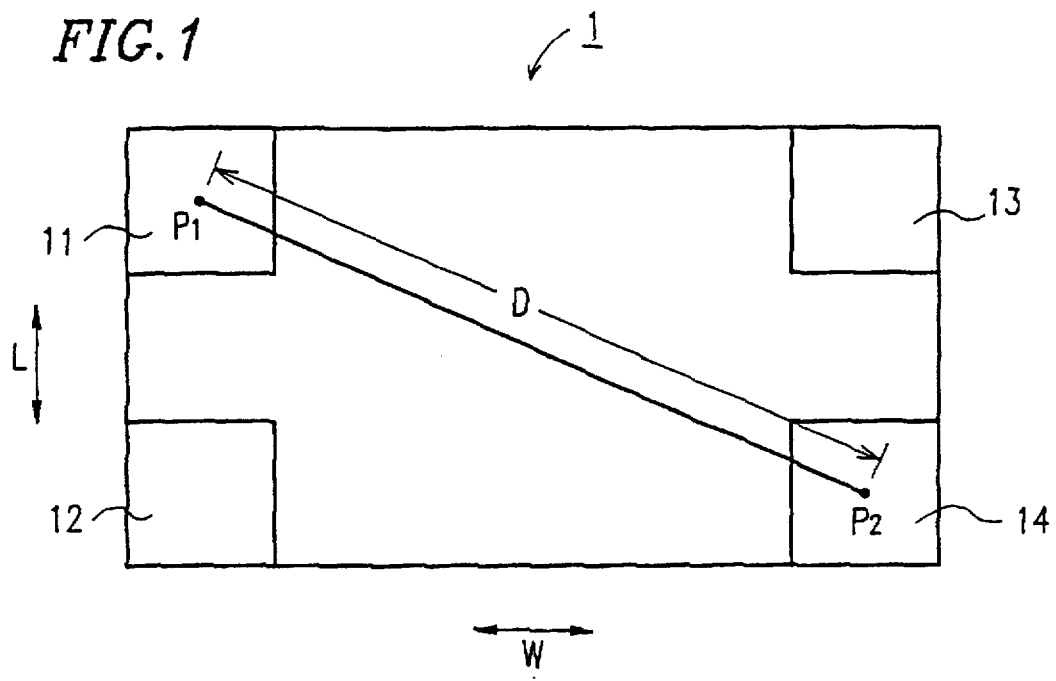
FIG. 1 is a schematic view showing a method for measuring $A_{max}$ of an oriented polystyrene film according to the present invention.
Figure 2A:
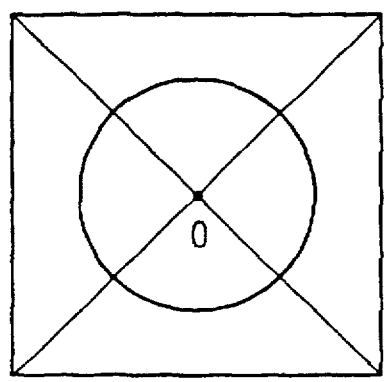
FIGS. 2A and 2B are schematic views showing a method for measuring $HS_{max}$ of the oriented polystyrene film according to the present invention.
Figure 2B:
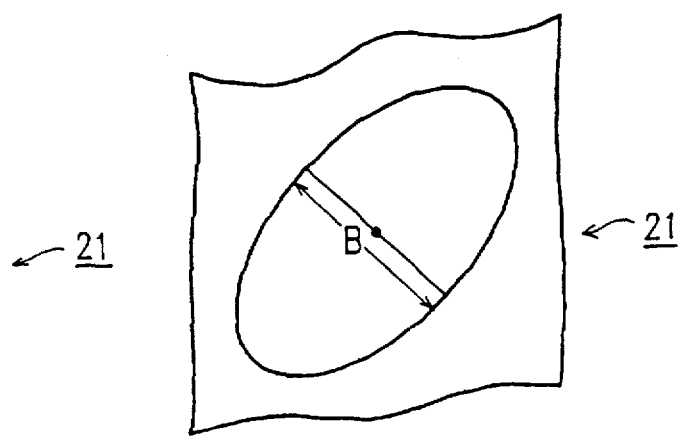

Hereinafter, an oriented polystyrene film containing a polystyrene polymer having a syndiotactic configuration in a first embodiment according to the present invention will be described with reference to FIGS. 1, 2A and 2B.

A rectangular sample 1 of the oriented polystyrene film has value C expressed by equation (I) of about 0.007 or less, and preferably of about 0.006 or less. If value C exceeds about 0.007, the film will not have a satisfactory flatness. As a result, the post-processing (coating, etc.) operation will be inferior, and additionally the film will not pass through the copier sufficiently smoothly.

$$C = \frac{A_{max}}{90°} \times \frac{HS_{max}}{R} \quad (I)$$

The rectangular sample 1 can be obtained from (A) or (B) described below.

(A) A rolled film extending in a longitudinal direction (L) and having a width in a width direction (W) perpendicular to the longitudinal direction. Two sides of the rectangular sample 1 are each 1,000 mm in length in the longitudinal direction (L) of the rolled film, and the other two sides each have a size equal to the width of the film.

(B) A sheet of an arbitrary shape. The rectangular sample 1 constitutes an inscribed rectangle having an area larger than any other inscribed rectangle.

$A_{max}$ is obtained in the following manner. First, four squares 11, 12, 13 and 14, each having sides of 100 mm in length, are designated in the four apices of the rectangular sample 1. An orientation angle of molecules at an arbitrary point in each of the four squares 11 through 14 is measured. In this specification, a direction determined by the orientation angle of molecules in each of the squares and the width direction (W) of the film is defined as the "orientation direction of molecules". Any one of the four squares 11 through 14 is selected as the "first square" (the square 11 in the first embodiment), and the orientation direction of the first square, is set to 0°. $A_{max}$ is an absolute value of an angle among angles defined by the orientation direction of molecules of the square 11 and an orientation direction of each of the other three squares 12, 13 and 14.

$A_{max}$ of the oriented polystyrene film in the first embodiment is preferably about 21° or less, and more preferably about 0° to about 18°. If $A_{max}$ exceeds about 21°, the film may become less flat after the post-processing.

The orientation direction of molecules of the oriented polystyrene film is measured mainly in order to evaluate the degree of alignment of the molecular chains of the polystyrene polymer having a syndiotactic configuration in an amorphous area thereof. The orientation angle is obtained by analyzing an ellipse obtained by irradiating a surface of the film with microwaves using a molecular orientation direction meter.

In general, molecules of a polystyrene polymer having a syndiotactic configuration tend to align more uniformly in the direction in which the strength of the film is lower; namely, the molecular chains tend to align substantially in the direction of the shorter axis of the ellipse obtained above. The orientation angle of the molecules is an angle between the shorter axis and the width direction of the film. As the orientation angle is closer to 0°, the molecular chains tend to align in the width direction of the film; and as the orientation angle is closer to 90°, the molecular chains tend to align in the longitudinal direction of the film.

Accordingly, the angle between the orientation direction of the molecules in the square 11, the angle being set to 0°, and the orientation direction of the molecules in each of the squares 12 through 14 is obtained from the difference between the orientation angle of the molecules in the square 11 and the orientation angle of the molecules in each of the squares 12 through 14.

R is expressed by equation (II):

$$R = D/1000 \quad (II)$$

D is the distance (mm) between the center of gravity $P_1$ of the reference square 11 and the center of gravity $P_2$ of the square having $A_{max}$ after heating. (In FIG. 1, the square 14 has $A_{max}$.) When R exceeds 1, R is defined as "1".

$HS_{max}$ is obtained in the following manner. One of the four squares 11 through 14 is cut out as a square sample 21 from the rectangular sample 1. As shown in FIG. 2A, a circle is designated on the square sample 21, the circle having a diameter of 50 mm and having the intersection of the diagonal lines of the square sample 21 as the center O. The square sample 21 is dry-heated at a temperature of 150° C. for 30 minutes. The size change ratio of line B (FIG. 2B), the length (mm) of which was changed to a largest degree among lines passing the center O, was obtained as $HS_{max}$ by equation (IV).

$$HS_{max} = \frac{50 - B}{50} \quad (IV)$$

The absolute value of $HS_{max}$ of the oriented polystyrene film in the first embodiment is preferably about 0.03 or less, and more preferably in the range of about 0 to about 0.025. If the absolute value of $HS_{max}$ exceeds about 0.03, the film will not have a satisfactory flatness. As a result, the post-processing (coating, etc.) operation will be inferior, and additionally the film will not pass through the copier sufficiently smoothly.

As appreciated from the above description, the flatness of the film and the smoothness by which the film passes through the copier depends on both of $A_{max}$ and $HS_{max}$.

The oriented polystyrene film in the first embodiment contains a polystyrene polymer, and the polystyrene polymer has a syndiotactic configuration with a high stereoregularity. A syndiotactic configuration refers to a configuration in which phenyl groups or substituted phenyl groups are arranged alternately with respect to a main chain. The tacticity of the syndiotactic configuration can be quantified by a conventional $^{13}C$ nuclear magnetic resonance method. The tacticity of the polystyrene polymer used in the present invention is as follows: for a diad (two adjacent repeating units), preferably 75% or more, and more preferably 80% or more; and for a pentad (five successive repeating units), preferably 30% or more, and more preferably 50% or more. If the tacticity of the diad is less than about 75% or if the tacticity of the pentad is less than about 30%, the oriented polystyrene film can undesirably be amorphous.

Examples of polystyrene polymers usable in the present invention include polystyrene and derivatives thereof. The derivatives of polystyrene include poly(alkylstyrene)s such as poly(p-methylstyrene), poly(m-methylstyrene), poly(o-methylstyrene), poly(2,4-dimethylstyrene), poly(2,5-dimethylstyrene), poly(3,4-dimethylstyrene), poly(3,5-dimethylstyrene), and poly(p-tert-butylstyrene); poly(halogenated styrene)s such as poly(p-chlorostyrene), poly(m-chlorostyrene), poly(o-chlorostyrene), poly(p-bromostyrene), poly(m-bromostyrene), poly(o-bromostyrene), poly(p-fluorostyrene), poly(m-fluorostyrene), poly(o-fluorostyrene), poly(p-methyl-p-fluorostyrene), poly(m-methyl-p-fluorostyrene), and poly(o-methyl-p-fluorostyrene); poly(halogenated alkylstyrene)s such as poly(p-chloromethylstyrene), poly(m-chloromethylstyrene), and poly(o-chloromethylstyrene); poly(alkoxystyrene)s such as poly(p-methoxystyrene), poly(m-methoxystyrene), poly(o-methoxystyrene), poly(p-ethoxystyrene), poly(methoxystyrene), poly(o-ethoxystyrene); poly(carboxyalkylstyrene)s such as poly(p-carboxymethylstyrene), poly(m-carboxymethylstyrene), and o-carboxymethylstyrene); poly(alkyletherstyrene)s such as poly(p-vinylbenzylpropyl); poly(alkylsilylstyrene)s such as poly(p-trimethylsilylstyrene); and poly(vinylbenzylmethoxyphosphite). Polystyrene is especially preferable. These polymers can be used independently or in combination of two or more.

Furthermore, a mixture of any of the above-mentioned polymers and another polystyrene polymer having, for example, an atactic configuration or an isotactic configuration can be used as long as the resultant polymer mixture fulfills the above-described range of tacticity. Also, a copolymer of two or more components of any of the above-mentioned polymers can be used as long as the above-described range of tacticity is fulfilled.

The weight-average molecular weight of the polystyrene polymer usable in the present invention is preferably about 10,000 or more, and more preferably about 50,000 to about 1,500,000. If the weight-average molecular weight is less than about 10,000, the film may be unsatisfactory with regards to the mechanical properties and the thermal resistance. If the weight-average molecular weight exceeds about 1,500,000, the film may rupture by an excessive tension applied in the step of stretching the film.

The oriented polystyrene film in the first embodiment can contain known additives such as an antioxidant, an antistatic agent, and a lubricant. The total content of such additives is preferably about 10 parts by weight or less with respect to 100 parts by weight of the polystyrene polymer. If the total content exceeds about 10 parts by weight, the film may rupture by an excessive tension applied in the step of stretching the film.

The oriented polystyrene film in the first embodiment is produced in the following manner.

First, a polystyrene polymer having a syndiotactic configuration is melted by an usual method, and the additives are added if necessary. Then, the resultant polymer is extruded to form an unstretched film. The unstretched film is stretched biaxially, namely, in longitudinal and width directions, sequentially or simultaneously, and thermal fixation is performed if necessary, resulting in the oriented polystyrene film according to the present invention.

For stretching the unstretched film in the longitudinal direction, two or more rolls having different circumferential speeds can be used. For heating the film during this step, heated rolls, a separate heating device which is not contacted with the film, or both of the rollers and the device can be used.

The heating temperature for stretching the film in the longitudinal direction is preferably from about 100° C. to about 140° C., and more preferably from about 110° C. to about 135° C. The stretching ratio (i.e., draw ratio) in the longitudinal direction is preferably within the range of about 2 to about 4, and more preferably within the range of from about 2.5 to about 4. Such stretching is preferably performed in a plurality of stages.

The heating temperature for stretching the film in the width direction is preferably from about 100° C. to about 160° C., and more preferably from about 110° C. to about 155° C. The stretching ratio in the width direction is preferably within the range from about 2 to about 5, and more preferably within the range from about 2.5 to about 5. Preferably, a central area of the film stretched in the width direction has a higher temperature than in an end area thereof. More preferably, the temperature of the central area is higher than the temperature of the end area by 20° C. to 40° C.

The stretched film can be thermally fixed without relaxation preferably at about 150° C. to about 280° C., and more preferably at about 170° C. to about 270° C. Alternatively, the stretched film can be thermally fixed at a temperature in such a range while being relaxed by about 1% to about 5%. The thermal fixation can be performed after the stretching in the longitudinal and width directions is finished, or can be performed in two-stages, i.e., once after the stretching in the longitudinal direction is finished and then after the stretching in the width direction is finished.

The oriented polystyrene film obtained in the first embodiment has a thickness of about 25 µm or more. If the thickness of the film is less than about 25 µm, the oriented film cannot pass through the copier sufficiently smoothly.

Hereinafter, an oriented polystyrene film containing a polystyrene polymer having a syndiotactic configuration in a second embodiment according to the present invention will be described.

The oriented polystyrene film in the second embodiment has a haze of about 1% or less, preferably of about 0.8% or less, and more preferably about 0.5% or less. If an oriented film having a haze exceeding about 1% is used as a protection film for the polarization plate of a liquid crystal display device, the haze will influence polarization, thus reducing the contrast. Accordingly, the quality of the image on the screen is lowered.

The oriented polystyrene film has a planar orientation degree ΔP of about −0.06 to about −0.04, preferably of about −0.058 to about −0.045, and more preferably of about −0.057 to about −0.047. If ΔP is less than about −0.06, cruise occurs and thus the haze exceeds about 1%. If ΔP is more than −0.04, the film will not have a satisfactory flatness. As a result, the post-processing (coating, etc.) operation will be inferior, and additionally the film will not pass through the copier sufficiently smoothly, thus causing the haze to exceed about 1%. In measuring ΔP, the refractive indices in the longitudinal, width and thickness directions of the oriented polystyrene film are measured by a known method.

The oriented polystyrene film in the second embodiment has a thermal shrinkape ratio of about 2% or less, preferably of about 1.8% or less, and more preferably of about 1.5% or less when being heated at 150° C. for 30 minutes. If the thermal shrinkage ratio in such a state exceeds about 2%, the film will not have a satisfactory flatness. As a result, the post-processing (coating, etc.) operation will be inferior, and additionally the film will not pass through the copier sufficiently smoothly. The thermal shrinkape ratio of the oriented polystyrene film is measured by the same method as the above-mentioned size change ratio and is expressed as a percentage of the size change ratio.

The oriented polystyrene film in the second embodiment also contains a polystyrene polymer having a high-degree syndiotactic configuration. Examples of the usable polystyrene polymers are the same as those in the first embodiment. Any of such polymers can contain the above-mentioned additives in a ratio of the above-described range.

The oriented polystyrene film in the second embodiment is produced in the following manner.

First, a polystyrene polymer having a syndiotactic configuration is melted by a conventional method, and the additives are added if necessary. Then, the melted polymer is extruded to form an unstretched film. The unstretched film is uniaxially or biaxially stretched. In the case where the film is biaxially stretched, the stretching can be performed in the two directions sequentially or simultaneously. Thus, the oriented polystyrene film in the second embodiment is produced. It is desirable to stretch the unstretched film to a large degree in the longitudinal direction by repeating small-degree stretching, and it is desirable to then stretch the film to a large degree in the width direction by repeating small-degree stretching, although the present invention is not limited to such a method.

The unstretched film can be stretched in the longitudinal direction in preferably two stages and more preferably three stages, using two or more rolls having different circumferential speeds. For heating the film during the stretching step in the longitudinal and width directions, heated rolls, a separate heating device which is not contacted to the film, or both of the rolls and the device can be used. Then, relaxation in the longitudinal direction and/or in the width direction and thermal fixation are performed in order to adjust the haze, the planar orientation degree ($\Delta P$), and the thermal shrinkage ratio.

The heating temperature for stretching the film in the longitudinal direction is preferably from about 100° C. to about 140° C., and more preferably from about 110° C. to about 135° C. The stretching ratio in the longitudinal direction is preferably within the range from about 2 to about 4, and more preferably within the range from about 2.5 to about 4. Such stretching is preferably performed in a plurality of stages.

The heating temperature for stretching the film in the width direction is preferably from about 110° C. to about 130° C., and more preferably from about 110° C. to about 120° C. The stretching ratio in the width direction is preferably within the range from about 2 to about 5, and more preferably within the range from about 2.5 to about 4.5. The film stretched in the width direction and/or in the longitudinal direction is relaxed preferably by about 1% to about 5%, and is fixed preferably at about 130° C. to about 220° C.

The resultant oriented polystyrene film is provided with an adhesive layer by in-line coating or off-line coating, or is surface-treated by, for example, corona discharge treatment or flame plasma treatment, in order to improve the adhesion of the film to other materials used in, for example, polarization plates of liquid crystal display devices, gelatine emulsifiers, toner of the copiers and also to improve the printability of the film. Thus, the oriented polystyrene film in the second embodiment is produced.

EXAMPLES

A plurality of films were produced as described in Examples 1 through 6 and comparative examples 1 through 3 and the resultant oriented films were evaluated for the following parameters as described hereinafter. The following examples are not intended to limit the present invention.

(1) $A_{max}$

As described above, a rectangular sample 1 (see FIG. 1) was obtained from a roller film, the rectangular sample having two sides of 1,000 mm in the longitudinal direction of the film and two sides having a size equal to the width of the film. Then, four squares 11, 12, 13 and 14 were designated in the four apices of the rectangular sample 1. Each of the four squares 11 through 14 had sides of 100 mm in length. The orientation angles of molecules of the squares 11, 12, 13 and 14 were measured using a molecular orientation direction meter (Bunshi Haikokei MOA-2001A, Kanzaki Seishi Kabushiki Kaisha). The orientation direction of any one of the four squares (the square 11 in these examples) was set to 0°. $A_{max}$ was obtained as an absolute value of an angle among angles defined by the orientation direction of molecules of the square 11 and an orientation direction of each of the other three squares 12, 13 and 14.

(2) $HS_{max}$

A square designated in an apex of the rectangular sample 1 and having sides of 100 mm in length was cut out from the rectangular sample 1 as a square sample 21. As shown in FIG. 2A, a circle was designated on the square sample 21, the circle having a diameter of 50 mm and having the intersection of the diagonal lines of the square sample 21 as the center O. The square sample 21 was suspended with no load in a Geer oven heated to 150° C. After 30 minutes, the square sample 21 was taken out of the oven, and the circle on the heated square sample 21 was analyzed using a digitizer. The size change ratio of line B (see FIG. 2B), the length (mm) of which was changed to a largest degree among lines passing the center O, was obtained as $HS_{max}$ by equation (IV).

$$HS_{max} = \frac{50 - B}{50} \tag{IV}$$

(3) Haze

Haze was obtained using Poic integration system HTR meter (SEP-H2D, Nihon Seimitsu Kogaku Kabushiki Kaisha) in compliance with JIS K 6714.

(4) Planar orientation degree ($\Delta P$)

The refractive indices $N_x$, $N_y$ and $N_z$ in the longitudinal, width and thickness directions were measured using an Abbe's refractive index meter (4T, Kabushiki Kaisha Atago). The planar orientation degree ($\Delta P$) was obtained by equation (III).

$$\Delta P = \frac{N_X + N_Y}{2} - N_Z \tag{III}$$

(5) Thermal shrinkage ratio

The thermal shrinkage ratio was calculated as a percentage of $HS_{max}$ obtained by using the same method as described above.

(6) Flatness after coating

The film was manually coated with polyester water dispersion (TIE51, Takemoto Yushi Kabushiki Kaisha) using a #10 wire bar and dried at 150° C. The film was classified as one of five classes 1 through 5 described below. A higher class number refers to a higher flatness.

Class 1: The film has waves throughout the entire film while in a stationary state, and the wave continue to remain when the film is supplied with a strong tension by, for example, manually applying a reasonable tension to attempt to smooth out the waves, at two opposing ends of the film.

Class 2: The film has waves throughout the entire film while in a stationary state, the waves partially continue to remain when the film is supplied with a strong tension by, for example, manually applying a reasonable tension to attempt to smooth out the waves, at two opposing ends of the film.

Class 3: The film has waves throughout the entire film while in a stationary state, and the waves disappear when the film is supplied with a strong tension by, for example, manually applying a reasonable tension to attempt to smooth out the waves, at two opposing ends of the film, at two opposing ends of the film.

Class 4: The film has waves partially throughout the film while in a stationary state, and the waves disappear when the film is supplied with a reasonably weaker tension at two opposing ends of the film.

Class 5: The film has no waves while in a stationary state.

(7) Flatness after passing through the copier

The film was coated with polyester water dispersion (TIE51, Takemoro Yushi Kabushiki Kaisha) at a ratio of 0.02 g/cm$^2$ was cut into B5 size and caused to pass through a copier (RICOPY FT6960, Ricoh Co., Ltd.). After that, the film was classified as one of classes 1 through 5. A higher class number refers to a higher flatness.

Class 1: The film is jammed in the copier.

Class 2: The film is wrinkled.

Class 3: The film is bent.

Class 4: A size change is found by measuring with a scale.

Class 5: No change in the appearance or size is found.

(8) Quality of the image displayed on the liquid crystal display device

The oriented polystyrene film obtained in the second embodiment having a thickness of 75 μm was applied to one of two surfaces of a polarization film, and a cellulose triacetate film having a thickness of 75 μm was applied to the other surface of the polarization film, thereby forming a polarization plate. The polarization plate and a liquid crystal panel were combined so that the cellulose triacetate film was facing the liquid crystal panel, thereby forming a liquid crystal display device. The resultant liquid crystal display device was classified as satisfactory (○) or unsatisfactory (X).

First, oriented polystyrene films were produced in Examples 1 through 4 and comparative examples 1 through 3 as described below, and the above-described parameters of each film are shown in Table 1.

(Example 1)

Polymer chips containing 99.5 wt. % of syndiotactic polystyrene (weight average molecular weight: 250,000) mixed with 0.5 wt. % of silica powder as a lubricant having an average grain size of 0.5 μm, a degree of scattering of 20%, and an areal shape factor of 80%, and polymer chips only containing the syndiotactic polystyrene (weight average molecular weight: 250,000) were mixed together at a weight ratio of 1:9 and dried. The extruded mixture was dissolved at 290° C. and extruded through a T die having a lip gap of 800 μm. Then, the resultant substance was caused to adhere to a cooling roll having a temperature of 50° C. by an electrostatic application method and solidified by cooling. Thus, an unstretched film having a thickness of about 300 μm was formed.

The unstretched film was pre-heated by an infrared heater having a surface temperature of 260° C. in the state of being located 20 mm away from the film, and then stretched to 1.4 times longer in the longitudinal direction using a rubber roll having a surface temperature of 130° C. The resultant film was further stretched to 2.28 times longer in the longitudinal direction using a ceramic roll having a surface temperature of 110° C. Next, the resultant film was pre-heated at 110° C. in a tenter, and then stretched to 3.2 times wider in the width direction in a zone which was set to have a temperature of 150° C. in an area corresponding to a central area of the film and to have a temperature of 120° C. in an area corresponding to a side area of the film. The resultant film was thermally fixed at 260° C. without being relaxed, and then relaxed in the width direction by about 3% at 230° C. Thus, an oriented polystyrene film having a thickness of about 30 μm was produced.

(Example 2)

An oriented polystyrene film having a thickness of about 29 μm was produced in the same manner as in Example 1 except for the following aspects in the steps after the unstretched film was obtained. The infrared heater, used for pre-heating, had a surface temperature of 350° C. The stretching of the film in the longitudinal direction using the rubber roll was performed to increase the length by 1.2 times, and the stretching of the film in the longitudinal direction using the ceramic roll was performed to increase the length to 2.67 times. In the zone which was set to have a temperature of 150° C. in an area corresponding to a central area of the film and to have a temperature of 120° C. in an area corresponding to a side area of the film, the film was stretched in the width direction by 2.67 times. The final stretching in the width direction was performed to increase the width to 1.2 times in a zone which was entirely set to a temperature of 150° C.

(Example 3)

An oriented polystyrene film having a thickness of about 29 μm was produced in the same manner as in Example 1 except for the following aspects in the steps after the unstretched film was obtained. The infrared heater used for pre-heating had a surface temperature of 350° C. The stretching of the film in the longitudinal direction using the rubber roll was performed to increase the length by 1.2 times, and the stretching of the film in the longitudinal direction using the ceramic roll was performed to increase the length to 2.67 times. The thermal fixation of the film with no relaxation was performed at 240° C.

(Example 4)

An oriented polystyrene film was obtained in the same manner as in Example 3. The resultant film was cut into a shape of a rhombus or the like by scissors.

(Comparative Example 1)

The unstretched film formed in Example 1 was stretched to 3.2 times longer in the longitudinal direction using a rubber roll heated to 130° C. The resultant film was pre-heated at 110° C. in a tenter and stretched to 3.2 times wider in the width direction at 120° C. The resultant film was thermally fixed at 260° C. without being relaxed, and then relaxed by 3% in the width direction at 230° C. Thus, an oriented polystyrene film having a thickness of 28 μm was produced.

(Comparative Example 2)

An oriented polystyrene film having a thickness of 30 μm was produced in the same manner as in Example 1 except for the following aspects in the steps after the pre-heating using the tenter. The resultant film was stretched to 3.2 times wider in the width direction at 120° C. The resultant film was thermally fixed at 220° C. without being relaxed, and then relaxed by 2% in the width direction at 200° C.

(Comparative Example 3)

An oriented polystyrene film having a thickness of 29 μm was produced in the same manner as in comparative example 1 except for the following aspects in the steps after the pre-heating using the tenter. The resultant film was stretched to 3.2 times wider in the width direction at 120° C. The resultant film was thermally fixed at 220° C. without being relaxed, and then relaxed by 2% in the width direction at 200° C.

TABLE 1

|  | A max | HSmax | D (mm) | C* | Flatness after coating | Flatness after passing through copier |
|---|---|---|---|---|---|---|
| Example 1 | 17.1 | 0.025 | 805 | 0.0059 | Class 5 | Class 4 |
| Example 2 | 15.3 | 0.022 | 1005 | 0.0037 | Class 5 | Class 4 |
| Example 3 | 16.0 | 0.033 | 1250 | 0.0063 | Class 4 | Class 4 |
| Example 4 | 5.6 | 0.035 | 364 | 0.0065 | Class 4 | Class 4 |
| Comparative example 1 | 25.0 | 0.025 | 965 | 0.0072 | Class 2 | Class 2 |
| Comparative example 2 | 13.3 | 0.032 | 590 | 0.0073 | Class 3 | Class 1 |
| Comparative example 3 | 27.3 | 0.033 | 1003 | 0.0115 | Class 1 | Class 1 |

*obtained by equation (I).

As shown in Table 1, the oriented polystyrene films produced in Examples 1 through 4 are all satisfactory with regards to the flatness after coating and the flatness after passing through the copier.

Oriented polystyrene films were produced in Examples 5 and 6 and comparative examples 4 and 5 as described below, and the above-described parameters of each film are shown in Table 2.

(Example 5)

Chips of syndiotactic polystyrene (weight average molecular weight: 250,000) were dried, melted at 290° C., and extruded through a T die having a lip gap of 1,500 μm. The extruded substance was caused to adhere to a cooled roll having a temperature of 50° C. by an electrostatic application method and solidified by cooling. Thus, an unstretched film having a thickness of about 1,000 μm was formed.

The resultant unstretched film was pre-heated to 90° C. by a metal roll, and further heated using three infrared heaters and thus stretched to 1.4 times longer in the longitudinal direction. Each of the three infrared heaters was formed of a silicon nitride rod having a diameter of 10 mm and had a stainless steel reflector having a surface temperature of 700° C. The stainless steel rod was adjusted to cause the infrared rays reflected by the reflector to be incident on the film perpendicularly. Next, the resultant film was put into contact with a silicone rubber roll heated to 100° C. and was heated by the above-described infrared heaters each having a surface temperature of 700° C. Thus, the film was stretched to 1.4 times longer in the longitudinal direction. The resultant film was further stretched to 1.8 times longer in the longitudinal direction using a ceramic roll heated to 130° C. The resultant film was pre-heated to 110° C. in a tenter. Then, the film was stretched to 1.9 times wider in the width direction at 110° C. and further stretched to 2.0 times wider in the width direction at 120° C. Then, the film was thermally fixed at 230° C. for 20 seconds. The resultant film was relaxed by 2% in the width direction at 200° C., and further relaxed by 1% in the width direction at 170° C. Thus, an oriented polystyrene film having a thickness of 75 μm was produced.

(Example 6)

An oriented polystyrene film having a thickness of 75 μm was produced in the same manner as in Example 5 except for the following aspects in the steps after the unstretched film was obtained and pre-heated by the metal roll. The pre-heated film was further heated by the above-described infrared heaters having a surface temperature of 700° C. and stretched to 1.3 times longer in the longitudinal direction. The resultant film was put into contact with a silicone rubber roll heated to 100° C., heated by the infrared heaters, and thus stretched to 1.3 times longer in the longitudinal direction. The resultant film was further put into contact with a silicone rubber roll heated to 120° C., heated by the infrared heaters, and thus stretched to 1.3 times longer in the longitudinal direction. Then, the film was stretched to 1.6 times longer in the longitudinal direction using a ceramic roll heated to 135° C.

(Comparative Example 4)

An oriented polystyrene film having a thickness of 75 μm was produced in the same manner as in Example 5 except for the following aspects in the steps after the unstretched film was obtained and pre-heated by the metal roll. The pre-heated film was further heated by the infrared heaters each having a surface temperature of 700° C. and stretched to 3.5 times longer in the longitudinal direction. Then, the film was pre-heated to 115° C. in a tenter and stretched to 3.8 times wider in the width direction at 115° C.

(Comparative Example 5)

An unstretched film having a thickness of 880 μm was obtained in the same manner as in Example 5. The unstretched film was pre-heated to 120° C. by a silicone rubber roll and stretched to 3.0 times longer in the longitudinal direction. The resultant film was preheated to 120° C. in a tenter and stretched to 3.0 times wider in the width direction at 120° C. Then, the film was further pre-heated to 120° C. by a silicone rubber roll and stretched to 1.3 times longer in the longitudinal direction. The resultant film was thermally fixed at 230° C. for 20 seconds without being relaxed. Thus, an oriented polystyrene film having a thickness of 75 μm was produced.

TABLE 2

|  | Haze (%) | ΔP | Thermal shrinkage ratio (%) | Flatness after coating | Flatness after passing through copier | Quality of image |
|---|---|---|---|---|---|---|
| Example 5 | 0.3 | −0.041 | 1.1 | Class 4 | Class 5 | ○ |
| Example 6 | 0.3 | −0.058 | 1.3 | Class 5 | Class 5 | ○ |
| Comparative example 3 | 1.3 | −0.061 | 1.8 | Class 3 | Class 3 | × |
| Comparative example 4 | 1.8 | −0.038 | 2.3 | Class 2 | Class 2 | × |

As shown in Table 2, the oriented polystyrene films produced in Examples 5 and 6 are both satisfactory in the transparency, the flatness after coating of polyester water dispersion (TIE51, Takemoro Yushi Kabushiki Kaisha), the flatness after passing through the copier, and the quality of the image displayed on the liquid crystal display device.

An oriented polystyrene film including a polystyrene polymer having a syndiotactic configuration according to the present invention is useful in optical devices, for example, as an OHP film, as well as for polarization plates in liquid crystal display devices, gelatine emulsifiers, toner for copiers and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An orineted polystyrene film including a polystyrene polymer having a syndiotactic configuration, the film having a thickness of 25 μm or more, and a rectangular sample of the film having a value C expressed by equation (I) of 0.007 or less:

$$C = \frac{A_{max}}{90°} \times \frac{HS_{max}}{R} \quad (I)$$

wherein the rectangular sample is obtainable from (A) or (B):

(A) a rolled film extending in a longitudinal direction and having a width in a width direction perpendicular to the longitudinal direction, two sides of the rectangular sample in sample in the longitudinal direction of the film each being 1,000 mm in length and the other two sides of the rectangular sample each having a size equal to the width of the film; or (B) a sheet of any shape, the rectangular sample constituting an inscribed rectangle having an area larger than any other inscribed rectangle, wherein $A_{max}$ is obtained by designating four squares respectively in four apices of the rectangular sample, each square having sides of 100 mm in length, and setting an orientation direction of molecules of a first square to 0°, $A_{max}$ being an absolute value of a maximum angle among angles defined by the orientation direction of molecules of the first square and an orientation direction of molecules of each of the other three squares, R is expressed by equation (II) but is defined as 1 when exceeding 1:

$$R = D/1000 \quad (II)$$

D is a distance (mm) between a center of gravity of the first square and a center of gravity of the square having the orientation direction which defines $A_{max}$ with the first square, and $HS_{max}$ is a size change ratio of a square sample which is cut from the rectangular sample and dry-heated at a temperature of 150° C. for 30 minutes, the square sample being designated in an apex of the rectangular sample and having sides of 100 mm in length.

2. An oriented polystyrene film according to claim 1; wherein $A_{max}$ is 21° or less.

3. An oriented polystyrene film according to claim 1, wherein an absolute value of $HS_{max}$ is 0.03 or less.

4. An oriented polystyrene film comprising a polystyrene polymer having a syndiotactic configuration, the oriented polystyrene film having a haze of 1% or less and a planar orientation degree ΔP expressed by equation (III) of 0.06 to −0.04:

$$\Delta P = \frac{N_X + N_Y}{2} - N_Z, \quad (III)$$

where $N_x$ is a refractive index of the film in a longitudinal direction, $N_y$ is a refractive index of the film in a width direction, and $N_z$ is a refractive index of the film in a thickness direction.

5. An oriented polystyrene film according to claim 4, having a thermal shrinkage ratio of 2% or less when heated at a temperature of 150° C. for 30 minutes.

6. An oriented polystyrene film according to claim 4, having a thickness of 25 μm or more.

* * * * *